United States Patent
Baracca et al.

(10) Patent No.: US 11,578,801 B2
(45) Date of Patent: Feb. 14, 2023

(54) COVER FOR A BEARING HOUSING AND SUPPORT ASSEMBLY FOR AN ASSOCIATED ROTATING SHAFT

(71) Applicant: Aktiebolaget SKF, Gothenburg (SE)

(72) Inventors: Fausto Baracca, Massa (IT); Andrea A. Bertolini, Carrara (IT); Fabio Cavacece, Rome (IT); Fabio Falaschi, Carrara (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 4 days.

(21) Appl. No.: 17/321,553

(22) Filed: May 17, 2021

(65) Prior Publication Data

US 2021/0364090 A1 Nov. 25, 2021

(30) Foreign Application Priority Data

May 25, 2020 (IT) .......................... 102020000012139

(51) Int. Cl.
*F16J 15/3248* (2016.01)
*F16C 33/78* (2006.01)
*F16C 35/04* (2006.01)

(52) U.S. Cl.
CPC ....... *F16J 15/3248* (2013.01); *F16C 33/7886* (2013.01); *F16C 35/045* (2013.01)

(58) Field of Classification Search
CPC .. F16J 15/3248; F16J 15/3252; F16J 15/3268; F16C 35/00; F16C 35/04; F16C 35/045; F16C 33/783; F16C 33/7886
See application file for complete search history.

(56) References Cited

U.S. PATENT DOCUMENTS

| | | | |
|---|---|---|---|
| 4,325,170 A * | 4/1982 | Verboom | F16J 15/3224 492/7 |
| 4,928,371 A | 5/1990 | Colanzi et al. | |
| 5,328,276 A * | 7/1994 | Linteau | F16C 33/76 384/477 |

(Continued)

FOREIGN PATENT DOCUMENTS

| CN | 105351366 | 2/2016 |
|---|---|---|
| CN | 210265542 | 4/2020 |

(Continued)

OTHER PUBLICATIONS

Search Report for corresponding Italian Patent Application No. 2020000012139 dated Feb. 9, 2021.

*Primary Examiner* — Nicholas L Foster
(74) *Attorney, Agent, or Firm* — Reed Smith LLP

(57) ABSTRACT

A cover for a bearing housing, in particular intended to be mounted on machinery for the food industry, provided with an end wall transverse to an axis of the bearing housing; with an annular side wall which extends transversely with respect to the end wall; and with an engaging portion towards the bearing housing, which is formed on one end of the side wall opposite to the end wall; a through-opening being formed through the end wall so as to allow the passage of a moving shaft, preferably a rotating shaft, and being surrounded by a reinforcing ring rigidly joined to and integral with the end wall so as to support a sealing element mounted on the through-opening and sealingly engaged by the moving shaft.

18 Claims, 1 Drawing Sheet

(56) References Cited

U.S. PATENT DOCUMENTS

| | | | | |
|---|---|---|---|---|
| 5,743,658 | A * | 4/1998 | Vollmer | H02K 5/1672 |
| | | | | 384/406 |
| 7,419,305 | B2 * | 9/2008 | Nisley | F16C 33/76 |
| | | | | 384/477 |
| 8,109,674 | B2 * | 2/2012 | Hubbard | F16C 33/7813 |
| | | | | 384/480 |
| 10,247,244 | B2 * | 4/2019 | Ress | F16C 23/084 |
| 11,378,128 | B2 * | 7/2022 | Baracca | F16J 15/062 |
| 2010/0272381 | A1 * | 10/2010 | Hubbard | F16J 15/3264 |
| | | | | 384/480 |
| 2018/0100546 | A1 * | 4/2018 | Ress | F16C 19/06 |
| 2019/0203763 | A1 * | 7/2019 | Ueno | F16C 19/385 |
| 2021/0285496 | A1 * | 9/2021 | Baracca | F16C 23/084 |

FOREIGN PATENT DOCUMENTS

| | | |
|---|---|---|
| DE | 102013109084 | 2/2015 |
| DE | 102018112338 | 11/2019 |
| WO | 20160156963 | 10/2016 |

* cited by examiner

COVER FOR A BEARING HOUSING AND SUPPORT ASSEMBLY FOR AN ASSOCIATED ROTATING SHAFT

CROSS-REFERENCE TO RELATED APPLICATIONS

This application is based on and claims priority to Italian Patent Application No. 102020000012139 filed on May 25, 2020, under 35 U.S.C. § 119, the disclosure of which is incorporated by reference herein.

FIELD

The present disclosure relates to a cover for a bearing housing, in particular intended to be mounted on industrial machinery, for example machinery used in the food industry, and to a support assembly for moving shafts, for example rotating shafts, including such a cover, a bearing housing and a bearing, for example a rolling bearing.

BACKGROUND

As is known, the machinery used in the food industry has numerous moving parts supported by rotating or sliding shafts, for example conveyor belts, kneading machines, machines for washing fresh food.

All these machines must be frequently cleaned, usually with water containing detergents and/or disinfectants, in order to mitigate or prevent the possible formation of bacterial colonies which could contaminate the food. In such applications, it is necessary that machine components should not have interstices or other parts where dirt or the like may penetrate and accumulate.

BRIEF DESCRIPTION OF THE DRAWINGS

Various embodiments will now be described with reference to the accompanying drawings which illustrate non-limiting examples of embodiments in accordance with this disclosure, in which.

DETAILED DESCRIPTION

Interstices of a machine may even accumulate washing water following the cleaning of equipment. The stagnation and passage of liquids or moisture increases the potential for the proliferation of bacteria. This problem affects support assemblies of moving shafts, which may be of the end supporting type, i.e., inside which an end of the shaft is housed, and it becomes particularly important to deal properly with this problem in the case where the end of the shaft is of the through-fitting type. Support assemblies may be formed by a housing element, a bearing, and a cover. A housing element is generally annular and provided with a base or flange for fixing to the machine. A bearing, generally a rolling bearing (but it could also be a sliding friction bearing), is mounted inside the housing element and is coupled with a moving shaft. A cover, which is normally cup-shaped, force-fitted onto the housing element and, in the case of through-shafts, is typically provided with a central through-hole for passage of the shaft. Since these moving shafts may oscillate or even be subject to possible axial misalignment, in the case of through-shafts, the aforementioned intact condition and sealing capacity able to prevent the formation of bacteria and the entry of external contaminants and, in particular, to withstand the jets of pressurized washing fluid is often prejudiced such that, after washing operations, washing fluid which has penetrated inside the cover may be present.

A cover for a bearing housing is provided which does not have the drawbacks described above. In covers in accordance with this disclosure there is an excellent sealing action between cover and moving shaft. In particular such a cover prevents the penetration of liquids and dirt. Such a cover is particularly well suited to be mounted on machinery for the food industry, as well as a support assembly for moving shafts including said cover. But covers in accordance with this disclosure are not limited to food industry applications, and instead are useful in many applications. Thus, a cover for a bearing housing and a support assembly for moving shafts including said cover are provided.

Figure 1:
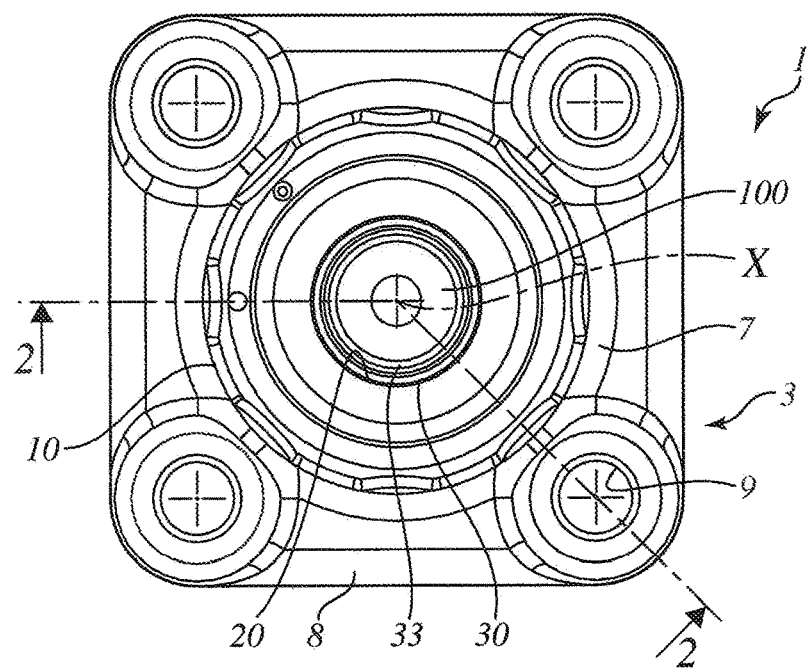
FIG. 1 shows a front elevation view of non-limiting embodiments of a support assembly for shafts provided in accordance with the disclosure.
Figure 2:
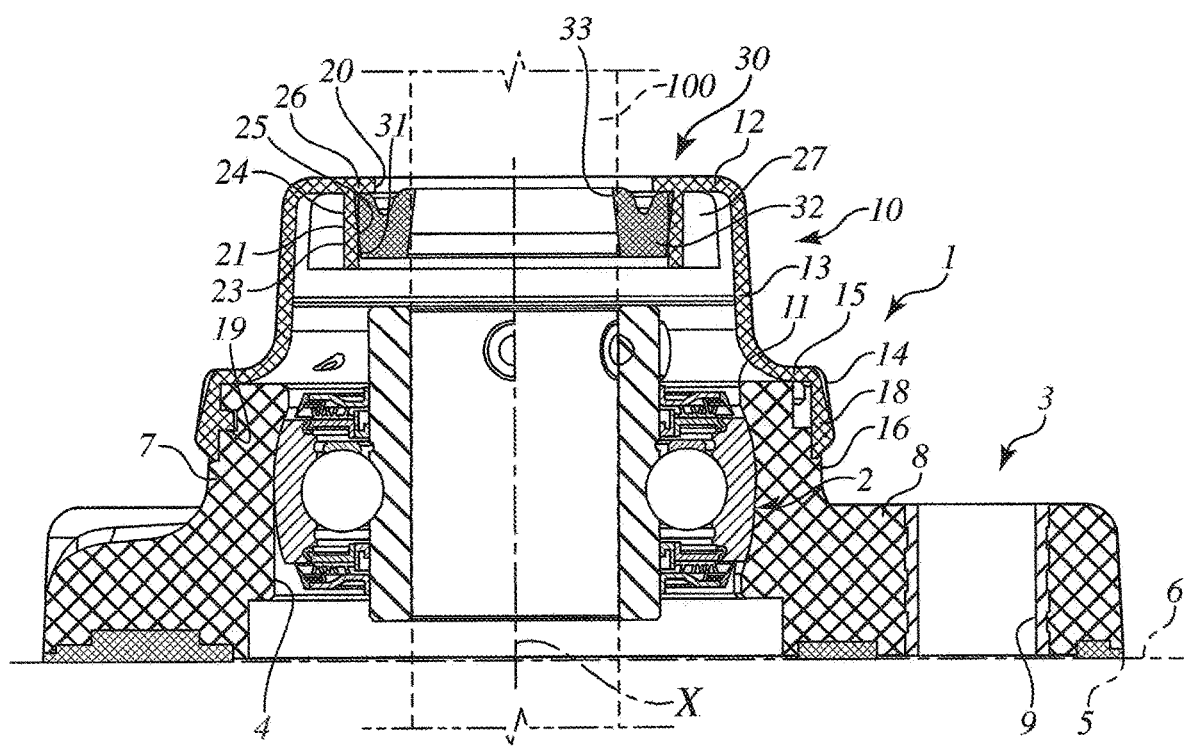
FIG. 2 shows a cross-sectional view along a plane II-II of a support assembly with an associated cover in accordance with the embodiments illustrated in FIG. 1.

With reference to FIGS. 1 and 2, 1 denotes overall a support assembly for moving shafts 100, i.e., rotating or sliding shafts.

A support assembly 1 includes a bearing 2 (FIG. 2), for example a rolling bearing—known and shown only as a hatched box for the sake of simplicity—designed to receive a moving shaft 100, for example a rotating shaft, so as to support it, and a bearing housing 3 having a through-seat 4 for receiving the bearing 2.

The bearing housing 3, which is in particular intended to be mounted on machinery for the food industry, is shown radially sectioned and in greater detail in FIG. 2. The bearing housing 3 is of the type intended to be mounted fixed onto a machine frame 5 of the known, type, indicated only partly by means of broken line in FIG. 2, in particular against a flat surface 6 of a machine frame 5 for the food industry.

The bearing housing 3 comprises a housing element 7 which is generally annular and is designed so as to be able to receive inside it—in particular inside the seat 4—the bearing 2, and a base or flange 8 for fixing to the machine frame 5; the seat 4 generally has an axis X of symmetry and the bearing 2 is generally mounted inside the seat 4 coaxial with the axis X; in the case shown the seat 4 has a curved side surface for allowing possible oscillations of the bearing 2 in order to compensate for any axial misalignment.

The base or flange 8 is provided with through-holes 9 for screws or bolts (known and not shown for the sake of simpler illustration) by means of which the base or flange 8 and, together with it, the entire support assembly 1 are rigidly fixed to the flat surface of the frame 5.

Obviously, the shape of the bearing housing 3 shown is only one of several possible shapes; for example, the base or flange 8, which in the example shown is square and perpendicular to the axis X, may have other symmetrical or asymmetrical shapes and/or be formed axially offset and laterally with respect to the housing element 7.

The support assembly 1 comprises a cover 10 for closing in a fluid-tight manner an inlet opening 11 of the internal seat 4 of the housing element 7 inside which the bearing 2 is mounted.

The cover 10 for the bearing housing 3 may have an overall cup-shaped and comprises an end wall 12, an annular side wall 13 which extends transversely with respect to the end wall 12 and an engaging portion 14 engaging the bearing housing 3.

The engaging portion 14 is annular, is formed integrally as one piece on one end 15 of the side wall 13 opposite to the end wall 12 and is designed to engage during use with the bearing housing 3 laterally on the outside of the bearing housing 3, i.e., in this case is configured as a cup-shaped joint and engages radially and laterally on the outside of a radially outer side surface 16 of the annular housing element 7, always present in any embodiment thereof.

The side surface 16 and the engaging portion 14 are defined by solids of revolution and have a common axis of symmetry coinciding with the axis X.

The cover 10 is made as one piece from a synthetic plastic material and the engaging portion 14 is provided on the opposite side to the end wall 12 with an annular sealing lip 18 which extends projecting at the front from a front edge 19 of the engaging portion 14 and which is made of the same synthetic plastic material as the cover 10.

The end wall 12, the side wall 13, the engaging wall 14 and the sealing lip 18 may all made of a polyurethane by means of injection-moulding as one piece. Surprisingly, this specifically selected material is that which has proved to be capable of providing the cover 10 with a sufficient rigidity such as to allow it to be stably engaged in any manner, for example by means of an interference fit or snap-engaging or bayonet joint, on the outside of the bearing cover 3 and at the same time provide the cover 10 with sufficient elasticity/flexibility to allow the sealing lip 18 to perform effectively its task by cooperating in a fluid-tight manner and in a self-draining manner with the side surface 16.

The cover 10 may comprise a through-opening 20 centred on the axis X and formed through the end wall 12 so as to allow the insertion therein of the moving shaft 100 or at least an end portion thereof, and a reinforcing ring 21 which is rigidly joined to and integral with the end wall 12 and is arranged around the through-opening 20. Preferably, in the cover 10 described above, the reinforcing ring 21 and the end wall 12, as well as the annular side wall 13 are made as one piece from a polymeric material which, as already described above, has proved to be capable of providing the cover 10 and the therefore also the ring 21 with sufficient rigidity.

According to that shown more clearly in FIG. 2, the reinforcing ring 21 comprises a cylindrical partition 23 which is coaxial with the axis X, extends towards the inside of the cover 10 in a direction substantially parallel to the axis X from the end wall 12, rigidly joined to the said end wall 12, and is arranged around the through-opening 20. The cylindrical partition 23 is delimited towards the outside by a cylindrical surface 24 and radially towards the inside by a conical surface 25, where here and below "conicity" of a conical or frustoconical surface is understood as meaning the side towards which the vertex of the geometrical cone which delimits said surface faces. Therefore, the conical surface 25 tapers from the opening 20 with an inclination with respect to the axis X which is an acute angle α, preferably less than 10°, so as to gradually reduce its diameter in the direction away from the said opening 20 and, moreover, the conical surface 25 at the opening 20 has an internal diameter having dimensions greater than the dimensions of an outer diameter of the opening so as to define an annular edge 26 around the said opening 20.

The reinforcing ring 21 further comprises a plurality of reinforcing ribs 27 which are rigidly joined to the said cylindrical partition 23 and extend out towards the side wall 13 along respective radial directions centred on the axis from the radially outer cylindrical surface 24 of the said cylindrical partition 23. Each rib 27 is formed in the manner of a fin arranged in a respective radial plane and is free both on the side directed towards the side wall 13 and on the side directed towards the inside of the cover 10, while it is fastened, since formed as one piece, to the end wall 12 thus helping reinforce even more both the partition 23 and the said end wall 12.

The cover 10 comprises, finally, a sealing element 30 which is made of approved and standardized rubber material so as to comply with the strict requirements of the American Food & Drug Administration and is housed inside a respective 31 defined by the conical surface 25. The sealing element 30 comprises, in turn, a cylindrical base 32 arranged radially in contact with the conical surface 23 and axially next to the edge 26, and an elastically deformable lip 33 which extends from the cylindrical base 32 radially towards the inside of the cover 10 and axially towards the opening 20 so as to penetrate partially inside the space of the said opening 20. The base 32 and the lip 33 are configured, viewed in axial cross-section, so that the sealing element 30 is substantially in the form of a V which opens out towards the opening 20, and the lip 33, arranged directly in contact with the moving shaft 100 so as to provide a fluid-tight seal with the cover 10, is able by means of its elasticity to compensate also for any movements of the moving shaft 100 due to axial misalignment and/or oscillations, thus ensuring the said intact condition and sealing action preventing the formation of bacteria and entry of external contaminants. Furthermore, the open-V form directed towards the opening 20 results not only in an improvement of the sealing action of the cover against pressurized water jets which are deviated back towards the outside of the said cover 10, but, together with the inclination of the conical surface 25, allows the cover to withstand also water jets with pressures of up to 100 bar.

Furthermore, the combination of an elastically deformable lip 33 connected to a base 32, together with a conical surface 25, not only increases the mutual area of contact between the lip 33 and moving shaft 100, but also compensates for any dimensional imprecision present both in the bearing housing 2 and due to flexing of the said moving shaft 100. In fact, the smaller diametrical dimension of the conical surface 25 is present at the point where the lip 33 engages with the base 32, namely at the point where a sealing element 30 has its smallest thickness: therefore, by simply adopting the conical surface 25, the sealing capacity of the element 30 may be increased without necessarily having to vary the dimensions, and the associated costs, of a sealing element 30 itself.

Moreover, the inclination of the conical surface 25 at the acute angle α, which is preferably less than 10°, allows also, if necessary, rapid replacement of the sealing element 30 both during disassembly and separation thereof from the seat 31 as well as during subsequent reassembly of a new sealing element 30 in the said seat 31, without the need to replace the entire cover 10.

Lastly, considering the polymeric material from which the cover 10 is made, the cover may not be very rigid and strong per se, but the strategic positioning of the ribs 27 arranged around the partition 23 and connected to the end wall 12 helps reinforce the cover 10 exactly at the point where it is most stressed, i.e., the opening 20, without increasing its weight or the amount of material used. Furthermore it also helps to provide an axially compact cover 10 such that the pressure generated by the shaft 100 on the elastically deformable lip 33 produces on the cover 10 a flexing moment which is correctly balanced by the lever arm which is created between the engaging portion 14 and the contact itself of the elastically deformable lip 33 with the shaft 100, preventing the risk of the elastically deformable lip 33 becoming detached as a result of deformation of the cover 10 itself. Furthermore, since the cover 10 is generally made by means of injection of polymeric material inside a mould, its compactness in the axial direction allows, net of the variations in thickness of the useful sections, for reinforcing the cover 10, and in any case uniform distribution of the polymeric material. This offsets factors that complicate production, such as the cooling direction and time and the method of injection of the material, to the advantage of a production process and costs. Axial compactness of the cover 10 and the material injection method used furthermore are such that a maximum amount of material may be present in the cross-section, thereby ensuring in any case that the cover 10 is per se sufficiently rigid as well as guaranteeing an excellent stability thereof during assembly.

In particular embodiments, a cover 10 may be provided with a reinforcing ring 21 as described above, may be advantageously used in environments where the limited axial volume available allows the use of covers 10 with respective axial lengths L contained within a range varying from a minimum length of 29.6 mm to a maximum length of 37.7 mm: within this range of axial lengths, moreover, the design described above is able to limit significantly the quantity of injected material and reduce greatly any problems associated with the injection process. The results of tests have shown that, outside of the aforementioned range from 29.6 mm to 37.7 mm, a cover 10 that may be used in such limited axial volume applications would be respectively too short or too long for ensuring fluid-tightness both as regards the engaging joint with the fixing base or flange 8 and the engagement with the shaft 100.

In addition to the exemplary embodiments, as described above, it is to be understood that numerous further variants exist. It must also be understood that said embodiments are only examples and do not limit the subject of the disclosure, nor its applications, nor its possible configurations. On the contrary, although the description provided above enables the person skilled in the art to implement the present disclosure at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A cover configured for a bearing housing, comprising:
    an end wall configured to be transverse to an axis of the bearing housing;
    an annular side wall extending transversely with respect to the end wall, the annular side wall comprising an inner diameter, wherein the end wall extends radially inwardly from the annular side wall; and
    an engaging portion configured to engage the bearing housing, wherein the engaging portion is formed on one end of the side wall opposite to the end wall;
    a through-opening formed through the end wall and configured to allow the passage of a moving shaft, the through-opening comprising a diameter less than the inner diameter of the annular side wall;
    a reinforcing ring rigidly joined to and integral with the end wall and arranged around the through-opening, the reinforcing ring comprising an inner diameter less than the inner diameter of the annular side wall and greater than the diameter of the through hole; and
    a sealing element mounted inside the reinforcing ring and configured to be sealingly engaged by the moving shaft.

2. The cover for a bearing housing according to claim 1, wherein the reinforcing ring, the end wall and the annular side wall are made as one piece from a polymeric material.

3. The cover for a bearing housing according to claim 1, wherein the reinforcing ring, the end wall and the annular side wall are made as one piece from a polymeric material by moulding.

4. The cover for a bearing housing according to claim 1, wherein the reinforcing ring comprises a cylindrical partition configured to be coaxial with the axis of the bearing housing and extending along the axis from the end wall towards an inside of the cover.

5. The cover for a bearing housing according to claim 4, wherein the cylindrical partition comprises a seat for housing the sealing element, the seat being delimited radially towards an outside by a conical surface.

6. The cover for a bearing housing according to claim 5, wherein the reinforcing ring comprises a plurality of reinforcing ribs rigidly joined to the cylindrical partition.

7. A support assembly configured to receive a moving shaft comprising:
    a bearing housing comprising a housing element and a base or flange configured for fixing to a machine frame, and
    a cover for closing in a fluid-tight manner an inlet opening of an internal seat of the housing element inside which a bearing is mounted, wherein the cover comprises:
    an end wall transverse to an axis of the bearing housing;
    an annular side wall which extends transversely with respect to the end wall, the annular side wall comprising an inner diameter, wherein the end wall extends radially inwardly from the annular side wall; and
    an engaging portion engaging the bearing housing, wherein the engaging portion is formed on one end of the side wall and opposite to the end wall;
    a through-opening formed through the end wall configured to allow the passage of the moving shaft, the through-opening comprising a diameter less than the inner diameter of the annular side wall;
    a reinforcing ring rigidly joined to and integral with the end wall and arranged around the through-opening, the reinforcing ring comprising an inner diameter less than the inner diameter of the annular side wall and greater than the diameter of the through hole; and
    a sealing element mounted inside the reinforcing ring and configured to be sealingly engaged by the moving shaft.

8. The support assembly according to claim 7, wherein the reinforcing ring, the end wall and the annular side wall are made as one piece from a polymeric material.

9. The support assembly according to claim 7, wherein the reinforcing ring, the end wall and the annular side wall are made as one piece from a polymeric material by moulding.

10. The support assembly according to claim 7, wherein the reinforcing ring comprises a cylindrical partition coaxial with the axis of the housing and extending along the axis from the end wall towards an inside of the cover.

11. The support assembly according to claim 10, wherein the cylindrical partition comprises a seat for housing the sealing element, the seat being delimited radially towards an outside by a conical surface.

12. The support assembly according to claim 11, wherein the reinforcing ring comprises a plurality of reinforcing ribs rigidly joined to the cylindrical partition.

13. A cover for closing in a fluid-tight manner when assembled with a bearing housing, the cover comprising:
- an end wall configured such that when assembled with the bearing housing it is transverse to an axis of a bearing housing;
- an annular side wall which extends transversely with respect to the end wall, the annular side wall comprising an inner diameter, wherein the end wall extends radially inwardly from the annular side wall; and
- an engaging portion configured such that when assembled with the bearing housing it engages the bearing housing, wherein the engaging portion is formed on the side wall opposite to the end wall;
- a through-opening formed through the end wall and configured to allow the passage of the moving shaft when assembled with the bearing housing, the through-opening comprising a diameter less than the inner diameter of the annular side wall;
- a reinforcing ring rigidly joined to and integral with the end wall and arranged around the through-opening, the reinforcing ring comprising an inner diameter less than the inner diameter of the annular side wall and greater than the diameter of the through hole; and
- a sealing element mounted inside the reinforcing ring and configured to be sealingly engaged by the moving shaft.

14. The cover for a bearing housing according to claim 13, wherein the reinforcing ring, the end wall and the annular side wall are made as one piece from a polymeric material.

15. The cover for a bearing housing according to claim 13, wherein the reinforcing ring, the end wall and the annular side wall are made as one piece from a polymeric material by moulding.

16. The cover for a bearing housing according to claim 13, wherein the reinforcing ring comprises a cylindrical partition configured to be coaxial with the axis of the bearing housing and extending along the axis from the end wall towards an inside of the cover.

17. The cover for a bearing housing according to claim 16, wherein the cylindrical partition comprises a seat for housing the sealing element, the seat being delimited radially towards an outside by a conical surface.

18. The cover for a bearing housing according to claim 17, wherein the reinforcing ring comprises a plurality of reinforcing ribs rigidly joined to the cylindrical partition.

* * * * *